E. F. HOWARD.
RESILIENT TIRE.
APPLICATION FILED OCT. 8, 1915.
1,205,995.
Patented Nov. 28, 1916.
2 SHEETS—SHEET 1.
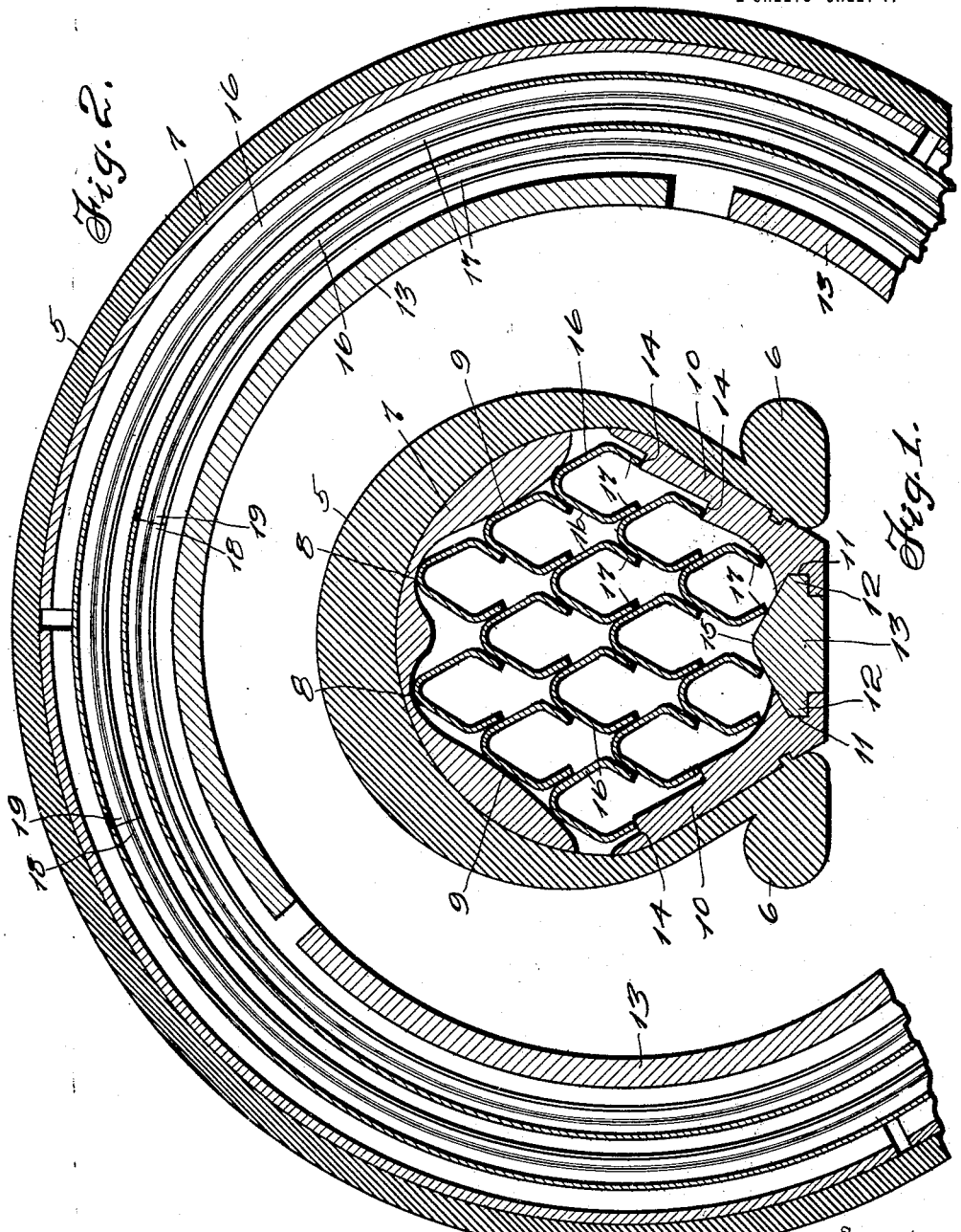
Inventor
Ernest F. Howard,
Witnesses
By C. L. Parker
Attorney

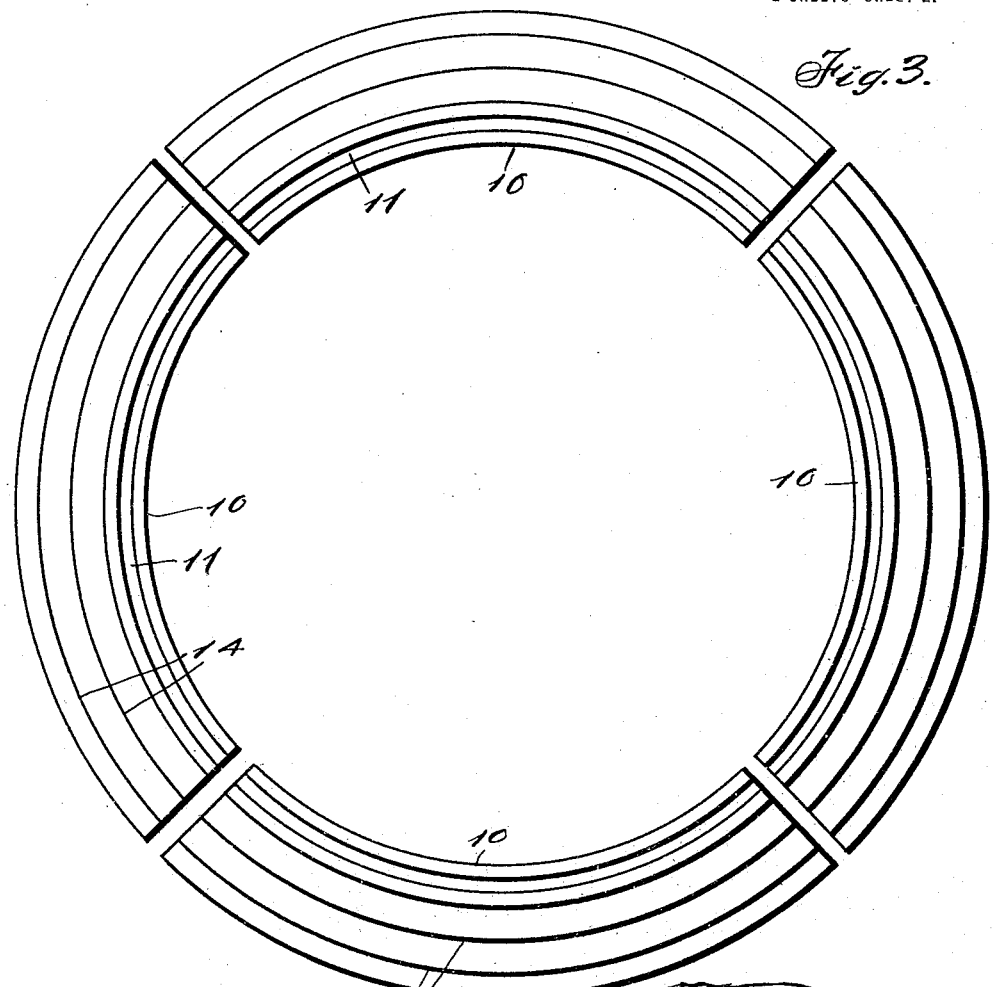

UNITED STATES PATENT OFFICE.

ERNEST F. HOWARD, OF ANSONIA, OHIO.

RESILIENT TIRE.

1,205,995.    Specification of Letters Patent.    Patented Nov. 28, 1916.

Application filed October 8, 1915. Serial No. 54,761.

*To all whom it may concern:*

Be it known that I, ERNEST F. HOWARD, a citizen of the United States, residing at Ansonia, in the county of Darke and State of Ohio, have invented certain new and useful Improvements in Resilient Tires, of which the following is a specification.

My invention relates to improvements in resilient tires, in which the casing is held distended by springs, and which are designed to be substituted for the ordinary pneumatic tire.

An important object of the invention is to provide a tire of the above mentioned character, having a spring filling, which will exert a continuous pressure within the casing, which is evenly distributed upon all portions thereof in a manner similar to the operation of the ordinary pneumatic tire, whereby my improved tire possesses the advantages of the pneumatic tire without its disadvantages, such as liability to collapsing when punctured.

A further object of the invention is to provide a tire of the above mentioned character, the spring elements of which are constantly maintained under pressure whereby they do not rattle or work loose.

Other objects and advantages of the invention will be apparent during the course of the following description.

In the accompanying drawings forming a part of this specification and in which like numerals are employed to designate like parts throughout the same, Figure 1 is a transverse sectional view through a tire embodying my invention. Fig. 2 is a sectional view taken through the central portion of the tire, in the plane of its rotation, a portion thereof being broken away. Fig. 3 is a side elevation of a side holding ring. Fig. 4 is a fragmentary perspective view of an outer tread ring, and, Fig. 5 is a similar view of one of the inner rings.

In the drawings, wherein for the purpose of illustration is shown a preferred embodiment of my invention, the numeral 5 designates a tire casing or shoe, having the usual beads 6. This tire casing is adapted to be secured upon the wheel of an automobile or other vehicle by any well known or preferred means.

Arranged within the tire casing or shoe 5 is an interior tread ring 7, which is preferably formed of metal. This tread ring is preferably formed in a plurality of separate sections which will permit of the same being conveniently assembled within the tire casing 5. The tread ring 7 is provided with recesses 8 and curved walls 9, as shown.

The numeral 10 designates side rings preferably formed of metal. These side rings are formed in a plurality of separate sections so that they may be conveniently placed within the tire casing 5. The side rings 10 are provided with grooves 11 to receive tongues 12 of an inner ring 13, which is also formed in a plurality of separate sections. The side rings 10 are provided with shoulders or supports 14, and the inner ring 13 has an inverted L-shaped wall 15, as shown.

The space between the rings 7, 10 and 13 is filled by compression rings 16, which are formed of suitably thin and resilient sheet metal, and are substantially inverted V-shaped in cross-section with their edges bent inwardly at an angle, as indicated at 17. Each compression ring 16 is provided with a transverse cut, forming free and separate ends 18 and 19, having interfitting detachable tongue and groove connection, whereby the end 19 may be swung inwardly with respect to the end 18, disconnected therefrom and the ring circumferentially contracted, so that it may be placed within the casing.

The compression rings 16 are preferably arranged within the casing in the manner indicated in Fig. 1, the angular ends 17 of some of the rings receiving therebetween the apexes of the other rings. The outermost rings 16 have their apexes projecting into the recesses 8 and the rings adjacent the members 10 have their angular portions 17 operating in proximity to the supports 14 but normally spaced from the lateral walls thereof, such side-rings serving as stop means when the tire is subjected to excessive pressure.

The tread ring 7 is first filled within the tire casing 5 and the tire casing filled with the compression rings 16, the same assuming the position indicated in Fig. 1. The sides of the tire casing may be slightly pried apart and the side rings 10 inserted in place, and the inner ring 13 placed between these side rings. The tire is then secured upon a wheel.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described the invention, what I claim is:—

1. In a tire of the character described comprising an outer casing, a plurality of metallic rings disposed within the casing and arranged parallel with the plane of rotation thereof, said rings being arranged in staggered relation affording free sliding contact one with another and interfitting to afford a resilient filler for the casing.

2. A tire of the character described, comprising an outer casing, and a plurality of resilient rings disposed within the casing parallel with the plane of rotation thereof and in staggered relation and formed substantially V-shaped in cross-section and having their edges bent inwardly at an angle.

3. A tire of the character described, comprising an outer casing, a plurality of resilient rings disposed in the outer casing parallel with the plane of rotation thereof and in staggered relation and formed substantially inverted V-shaped in cross-section and having their edges bent inwardly at an angle, a tread portion ring arranged between the resilient rings and the tread portion of the casing and having recesses to receive the outermost rings, and side rings disposed within the inner portion of the casing and having flanges to contact with the edges of the adjacent resilient rings.

In testimony whereof I affix my signature in presence of two witnesses.

ERNEST F. HOWARD.

Witnesses:
J. F. HOWARD,
TRACE LICKEL.

Copies of this patent may be obtained for five cents each, by addressing the "Commissioner of Patents, Washington, D. C."